United States Patent
Park et al.

(10) Patent No.: US 10,263,446 B2
(45) Date of Patent: Apr. 16, 2019

(54) BATTERY CONTROL CIRCUIT FOR POWER GENERATION SYSTEM USING RENEWABLE ENERGY

(71) Applicant: LSIS CO., LTD., Anyang-si, Gyeonggi-do (KR)

(72) Inventors: Kiwoo Park, Anyang-si (KR); Jiheon Lee, Anyang-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 84 days.

(21) Appl. No.: 15/585,097

(22) Filed: May 2, 2017

(65) Prior Publication Data

US 2017/0324266 A1    Nov. 9, 2017

(30) Foreign Application Priority Data

May 3, 2016  (KR) .................. 10-2016-0054833

(51) Int. Cl.
*H02J 7/08*  (2006.01)
*H02J 7/00*  (2006.01)
*H02J 7/34*  (2006.01)

(52) U.S. Cl.
CPC .............. *H02J 7/0068* (2013.01); *H02J 7/34* (2013.01); *H02J 7/345* (2013.01)

(58) Field of Classification Search
CPC ............ H02J 7/0068; H02J 7/34; H02J 7/345
USPC ................ 320/101, 130, 131, 134, 158, 163
See application file for complete search history.

(56) References Cited

U.S. PATENT DOCUMENTS

| 7,245,107 | B2 | 7/2007 | Moore et al. | |
| 2008/0053716 | A1* | 3/2008 | Scheucher | B60L 8/00 180/2.1 |
| 2013/0241464 | A1* | 9/2013 | Kim | H02J 7/00 320/101 |

FOREIGN PATENT DOCUMENTS

| JP | H03164035 | 7/1991 |
| JP | H07147166 | 6/1995 |
| JP | 10126975 | 5/1998 |
| JP | 1019990019360 | 3/1999 |
| JP | 2002315228 | 10/2002 |

(Continued)

OTHER PUBLICATIONS

Japanese Office Action for related Japanese Application No. 2017-091640; action dated Apr. 17, 2018; (3 pages).

(Continued)

*Primary Examiner* — Edward Tso
*Assistant Examiner* — Aaron Piggush
(74) *Attorney, Agent, or Firm* — K&L Gates LLP (57) ABSTRACT

The battery control circuit includes: a battery; a DC power supply unit; a first DC-DC converter providing a current path in a first direction of supplying the DC energy from the DC power supply unit to the battery, and a current path in a second direction of discharging the DC energy in the battery to a ground; a first capacitor fully discharging the battery in a manner that the sum of a voltage across the first capacitor and a voltage across the flow battery to be higher than an output voltage of the first DC-DC converter; a second DC-DC converter supplying the DC energy from the DC power supply unit to the first capacitor; and a controller controlling the first DC-DC converter to form the current flow path in the second direction when a number of times of charging and discharging the flow battery reaches a preset number.

10 Claims, 4 Drawing Sheets

(56) References Cited

FOREIGN PATENT DOCUMENTS

| | | |
|---|---|---|
| JP | 3551084 | 8/2004 |
| JP | 3807630 | 5/2006 |
| JP | 2009130960 A | 6/2009 |
| JP | 2012182857 | 9/2012 |
| KR | 1019990019360 | 3/1999 |

OTHER PUBLICATIONS

Korean Intellectual Property Office Search report dated Apr. 20, 2016, 10 pages.

* cited by examiner

BATTERY CONTROL CIRCUIT FOR POWER GENERATION SYSTEM USING RENEWABLE ENERGY

CROSS-REFERENCE TO RELATED APPLICATION

Pursuant to 35 U.S.C. § 119(a), this application claims the benefit of earlier filing date of and right of priority to Korean Application No. 10-2016-0054833, filed on May 3, 2016, the contents of which are all hereby incorporated by reference herein in its entirety.

BACKGROUND OF THE INVENTION

1. Field of the Invention

This disclosure relates to a power generation system using renewable energy, and more particularly, a battery control circuit of a flow battery for compensating for an output in a power generation system using renewable energy.

2. Background of the Invention

A battery is a device that converts chemical energy into electrical energy. The battery may be constructed by connecting two or more batteries and allowing currents to flow in the same direction.

Batteries may be classified into a non-rechargeable battery type when discharged and a rechargeable battery type after discharged.

Recently, with development of a large-capacity application of a battery, a zinc-bromine flow battery which has been developed to be used as an Energy Storage System (ESS) for output compensation in a power generation system using renewable energy, such as smart grid, wind power generation, solar power generation, tidal power generation, geothermal power generation, etc., has stability and price competitiveness. Here, the zinc-bromine flow battery is a kind of battery that can be recharged after discharged.

The zinc-bromine flow battery has a characteristic that it should perform a full discharge (so-called strip operation) when charging and discharging are repeated about 6-10 times. This is for balanced distribution of accumulated zinc.

In the related art, when performing the strip operation with respect to the zinc-bromine flow battery, if a voltage of the zinc-bromine flow battery is reduced down to a predetermined level, the strip operation of the zinc-bromine flow battery merely by a switching operation of a switching element within a converter, which controls recharging and discharging of the zinc-bromine flow battery is failed.

Accordingly, in the related art battery control circuit, a resistor should be connected to a battery in order to perform the strip operation.

However, when the battery connected with the resistor is discharged, heat is generated in the resistor. In this instance, if a heat sink is installed for rapid and effective heat dissipation, volumes of the battery and the battery control circuit increase.

SUMMARY OF THE INVENTION

Therefore, the present invention is to solve the related art problems, namely, an aspect of the present invention is to provide a battery control circuit for a power generation system using renewable energy, capable of preventing heat generation during a strip operation of a flow battery, preventing an increase in volumes of a battery and the battery control circuit, and stably performing the strip operation with respect to the battery.

To achieve these and other advantages and in accordance with the purpose of this disclosure, as embodied and broadly described herein, there is provided a battery control circuit for a power generation system using renewable energy, the circuit comprising: a flow battery that is charged with direct current (DC) electric energy or discharges charged DC electric energy; a DC power supply unit that has an anode and a cathode, and supplies the DC electric energy to the flow battery; a first DC-DC converter that connected between the DC power supply unit and the flow battery, and the first DC-DC converter has a switching element providing current flow paths in two directions, the two directions including a first direction of supplying the DC electric energy from the DC power supply unit to the flow battery, and a second direction of discharging the DC electric energy charged in the flow battery to a ground; a first capacitor that is connected in series to the flow battery, the first capacitor fully discharging the flow battery in a manner that the sum of a voltage across the first capacitor and a voltage across the flow battery becomes higher than an output voltage of the first DC-DC converter when fully discharging the flow battery; a second DC-DC converter that is connected between the DC power supply unit and the first capacitor, and has a switching element switched to a position of supplying the DC electric energy from the DC power supply unit to the first capacitor such that the first capacitor is charged; and a controller that controls the first DC-DC converter and the second DC-DC converter, the controller controlling the switching element of the first DC-DC converter to form the current flow path in the second direction when a number of times of charging and discharging the flow battery reaches a preset number of times.

According to one aspect of the present invention, a charge voltage of the first capacitor is higher than the output voltage of the first DC-DC converter when fully discharging the flow battery.

According to another aspect of the present invention, the battery control circuit further comprises a bypass switch connected in parallel to the first capacitor, and controlled to a closing position by the controller when charging or discharging the battery.

According to still another aspect of the present invention, the battery control circuit further comprises a discharge switch connected in parallel to the bypass switch, and controlled to a closing position by the controller when discharging electric energy charged in the first capacitor.

According to still another aspect of the present invention, the controller is configured to control the bypass switch to an opening position to charge the first capacitor, when the voltage between the both ends of the flow battery becomes a preset value while the flow battery is fully discharged.

According to still another aspect of the present invention, the controller is configured to control the switching element of the first DC-DC converter to form the current flow path in the second direction and the switching element of the second DC-DC converter to be turned on, such that the sum of the voltage between the both ends of the flow battery and the voltage between the both ends of the first capacitor is maintained to be higher than the output voltage of the first DC-DC converter, in order to fully discharge the flow battery.

According to still another aspect of the present invention, when the battery is fully discharged, the controller is configured to controls the bypass switch to be turned off and the discharge switch to be turned on so as to discharge the first capacitor.

According to still another aspect of the present invention, when the first capacitor is discharged, the controller is configured to control the bypass switch to be turned on, the discharge switch to be turned off, and the switching element of the second DC-DC converter to be turned off, so as to charge and discharge the battery again.

According to still another aspect of the present invention, the first DC-DC converter comprises: a first switching element that is connected to an anode side of the DC power supply unit and provides a charging path of the battery; a second switching element that is connected in series to the first switching element and provides a discharging path of the battery; and an inductor that has one end connected to a connection point where the first switching element and the second switching element are connected to each other, and another end connected to the flow battery, the inductor allowing a flow of a DC component and blocking a flow of an AC component.

According to still another aspect of the present invention, the first DC-DC converter is configured to charge or discharge the flow battery by switching operations of the first switching element and the second switching element, wherein the controller is configured to control the first switching element to be turned on and the second switching element to be turned off when charging the battery, and wherein the controller is configured to control the second switching element to be turned on and the first switching element to be turned off when discharging the battery.

According to still another aspect of the present invention, the DC power supply unit comprises: a voltage source that supplies a DC voltage; and a second capacitor that is connected in parallel to the voltage source to smooth the DC voltage from the voltage source to a constant voltage and supply the constant voltage.

BRIEF DESCRIPTION OF THE DRAWINGS

The accompanying drawings, which are included to provide a further understanding of the invention and are incorporated in and constitute a part of this disclosure, illustrate exemplary embodiments and together with the description serve to explain the principles of the invention.

In the drawings.

DETAILED DESCRIPTION OF THE INVENTION

Description will now be given in more detail of embodiments disclosed herein, with reference to the accompanying drawings.

Advantages and characteristics and a method of achieving those in the present invention will be apparent with reference to embodiments to be described hereinafter in detail, together with the accompanying drawings. The same/like reference numerals refer to the same/like components throughout the disclosure.

Hereinafter, a battery control circuit for a power generation system using renewable energy according to the preferred embodiments of the present invention will be described in detail with reference to the accompanying drawings.

Figure 1:
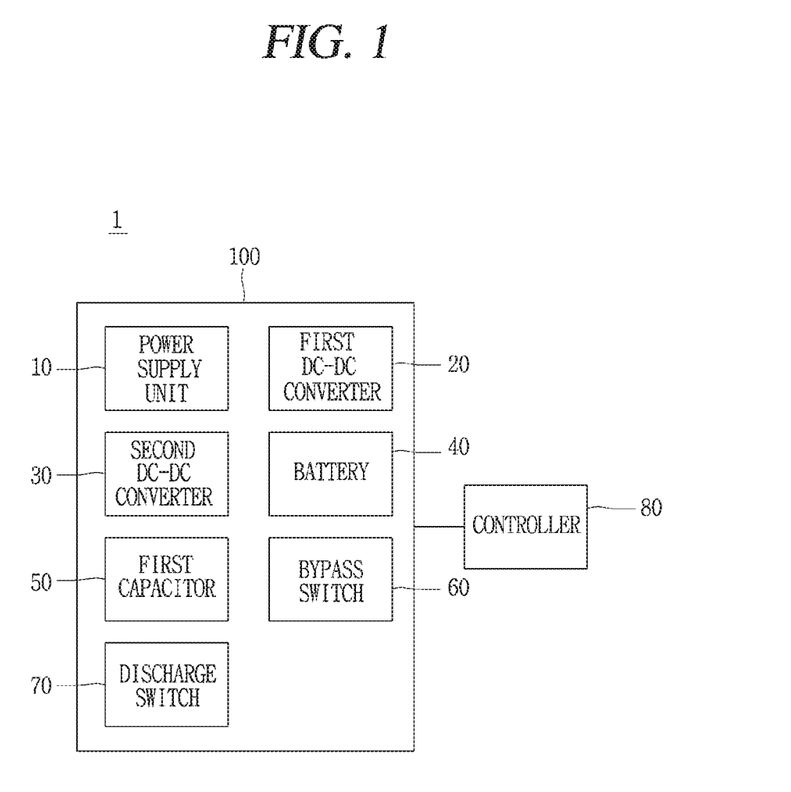
FIG. 1 is a block diagram illustrating a configuration of a battery control circuit for a power generation system using renewable energy in accordance with one preferred embodiment of the present invention.

FIG. 1 is a block diagram illustrating a configuration of a battery control circuit for a power generation system using renewable energy in accordance with one embodiment of the present invention Referring to FIG. 1, a battery control circuit 1 may include a control circuit part 100 and a controller 80.

The control circuit part 100 includes a direct-current (DC) power supply unit 10, a first DC-DC converter 20, a second DC-DC converter 30, a flow battery (hereinafter, referred to as a battery) 40, a first capacitor 50, a bypass switch 60, and a discharge switch 70.

The controller 80 may control an overall operation of the control circuit part 100 and can be configured with a computer device such as a microprocessor or a microcomputer that can operate according to a prestored processing program.

Specifically, the controller 80 can control a switching operation of the first DC-DC converter 20, a switching operation of the second DC-DC converter 30, a switching operation of the bypass switch 60, and a switching operation of the discharge switch 70.

In addition, the controller 80 may sense operation states of the components included in the control circuit part 100 and reflect the operation states in related control operations.

The DC power supply unit 10 may supply DC power to the control circuit part 100.

The first DC-DC converter 20 includes a switching element, and convert DC electric energy input from the DC power supply unit 10 by the switching operation of the switching element. Preferably, the first DC-DC converter 20 may receive the DC electric energy from the DC power supply unit 10, perform a DC-DC conversion with respect to the received DC electric energy, and supply the converted DC electric energy to the battery 40.

Also, the first DC-DC converter 20 can be configured with a Buck-Boost converter according to a preferred embodiment, and the buck-boost converter can boost or buck a voltage of the DC electric energy input from the DC power supply unit 10.

The buck-boost converter may be a bi-directional converter. That is, the first DC-DC converter 20 may include a switching element providing current flow paths in two directions, namely, a first direction of supplying the DC electric energy from the DC power supply unit 10 to the battery 40, and a second direction of discharging the DC electric energy charged in the battery 40 to the ground.

The first DC-DC converter 20 may boost or buck the voltage supplied from the DC power supply unit 10 at an output end of the first DC-DC converter 20 through the switching operation of the switching element.

For example, in case where the voltage of the battery 40 is 50V, the voltage supplied from the DC power supply unit 10 is 50V, and the battery 40 is to be charged, when an output voltage of the first DC-DC converter 20 is controlled to be 52V by switching the first DC-DC converter 20, electric energy of 2V may be charged in the battery 40.

Conversely, when the battery 40 is to be discharged, the controller 80 may switch the first DC-DC converter 20 so that the output voltage of the first DC-DC converter 20 becomes 47 V. Accordingly, electric energy of 3 V may be discharged from the battery 40.

The battery 40 is included in the power generation system using the renewable energy and operates as an Energy Storage System (ESS) for output compensation of a generator.

The battery 40 charges or discharges the voltage input from the DC power supply unit 10 under the control of the controller 80.

The battery 40 can be configured with a zinc-bromine flow battery according to a preferred embodiment.

The second DC-DC converter 30 may include a switching element, and convert the DC electric energy input from the DC power supply unit 10 by the switching operation of the switching element. Preferably, the second DC-DC converter 30 can receive the DC electric energy from the DC power supply unit 10, perform a DC-DC conversion with respect to the received DC electric energy, and supply the converted DC electric energy to the first capacitor 50.

Therefore, the charge voltage of (voltage charged in) the first capacitor 50 may be controlled by the switching control of the switching element of the second DC-DC converter 30.

Also, the second DC-DC converter 30 can boost or buck the voltage of the DC electric energy input from the input DC power supply unit 10.

The second DC-DC converter 30 can be configured with a unidirectional converter that supplies DC electric energy in a charging direction of the first capacitor 50 according to one preferred embodiment.

The second DC-DC converter 30 can boost or buck the voltage supplied from the DC power supply unit 10 at an output end of the second DC-DC converter 30 through the switching operation of the switching element.

The switching elements included in the first DC-DC converter 20 and the second DC-DC converter 30 may be semiconductor switches and electric power devices that can be turned on or off by a control signal from the controller 80. For example, those switching elements may be transistors, thyristors, or Insulated Gate Bipolar Transistors (IGBTs).

The first capacitor 50 is connected in series to the battery 40 and serves to fully discharge the battery 40 in a manner that the sum of a voltage across the battery 40 and a voltage across the first capacitor 50 becomes higher than the output voltage of the first DC-DC converter 20.

In the related art, a resistor has been used for the strip operation of the battery 40, but in the present invention, the first capacitor 50 is used for the strip operation of the battery 40.

Without the use of the resistor for the strip operation of the battery 40, an operation effect without a heat generation problem can be obtained.

The controller 80 can also control charging and discharging of the battery 40 through the first DC-DC converter 20 and control the charge voltage of the first capacitor 50 through the second DC-DC converter 30. Accordingly, the controller 80 can control the total voltage of the voltage charged in the battery 40 and the voltage charged in the first capacitor 50, thereby facilitating the strip operation of the battery 40.

The bypass switch 60 can be turned on or off according to the control of the controller 80.

The bypass switch 60 can be provided as a switch for charging the first capacitor 50.

In addition, a strip operation time point of the battery 40 can be determined according to the switching of the bypass switch 60.

The discharge switch 70 can be turned on or off according to the control of the controller 80.

The discharge switch 70 may be provided as a switch for discharging the first capacitor 50.

Figure 2:
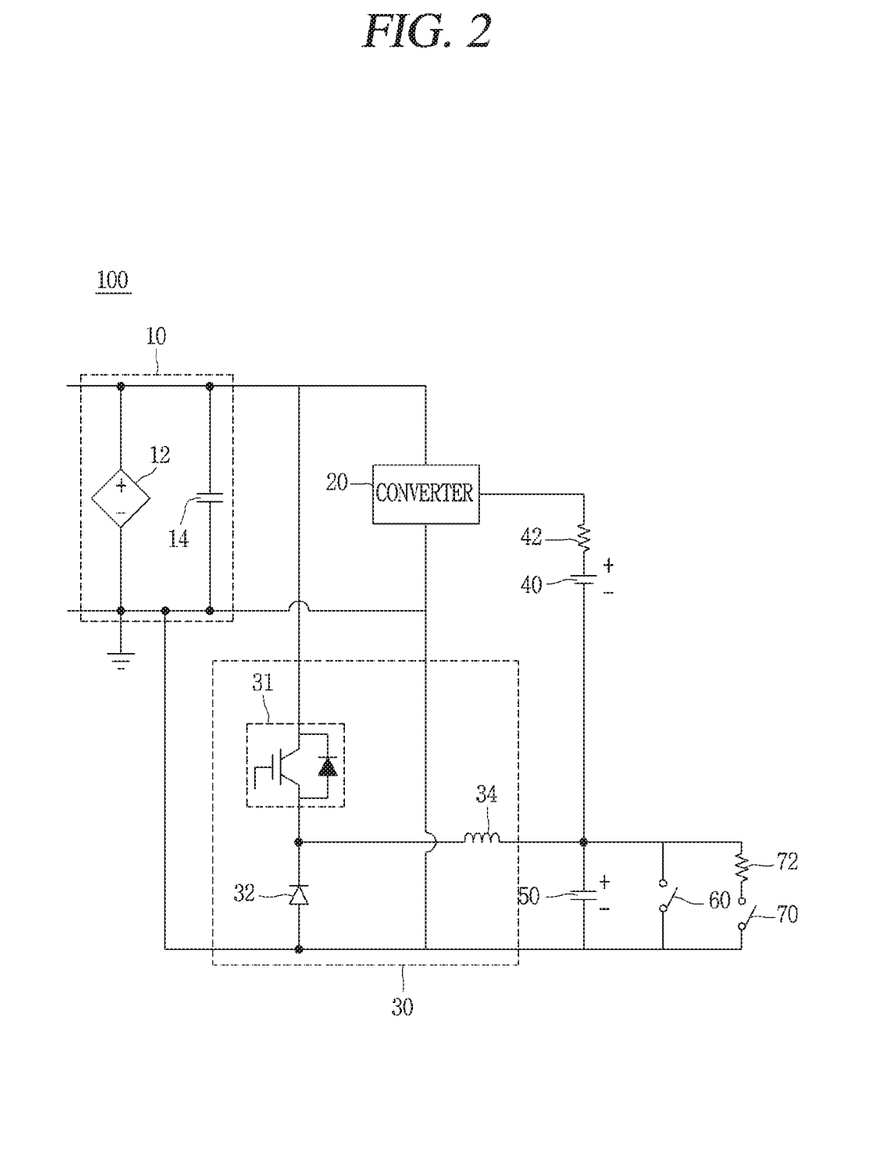
FIG. 2 is a circuitry view illustrating a detailed circuit configuration of a battery control circuit excluding a controller in accordance with one preferred embodiment of the present invention.

FIG. 2 is a circuitry view illustrating a detailed circuit configuration of a battery control circuit excluding a controller, in accordance with one preferred embodiment of the present invention.

Hereinafter, the detailed circuit configuration of the battery control circuit excluding the controller according to the preferred embodiment of the present invention will be described with reference to FIG. 2.

As illustrated in FIG. 2, the control circuit part 100, which is a battery control circuit according to the present invention excluding a controller, includes a DC power supply unit 10, a first DC-DC converter 20, a second DC-DC converter 30, a battery 40, a first capacitor 50, a bypass switch 60, and a discharge switch 70.

As illustrated, the DC power supply unit 10 includes a DC voltage source 12 and a second capacitor 14.

The DC voltage source 12 can be configured with a DC power source supplied from a regeneration energy generator (not illustrated).

The second capacitor 14 may supply as a constant DC voltage a DC voltage, which is supplied from the DC voltage source 12, to the first DC-DC converter 20 and the second DC-DC converter 30 through charging and discharging.

The first DC-DC converter 20 can receive DC electric energy from the DC power supply unit 10, perform a DC-DC conversion with respect to the received DC electric energy, and supply the converted DC electric energy to the battery 40 to charge the battery 40.

Also, the first DC-DC converter 20 can discharge the DC energy charged in the battery 40 to the ground.

The second DC-DC converter 30, as described above, can receive the DC electric energy from the DC power supply unit 10, perform a DC-DC conversion with respect to the received DC electric energy, and supply the converted DC electric energy to the first capacitor 50.

As illustrated in FIG. 2, the second DC-DC converter 30 can be configured to include a switching element 31, a diode 32, and an inductor 34.

The switching element 31 can be configured with a single directional semiconductor switch, such as a transistor having an emitter connected to the anode side of the DC power supply unit 10, a base connected to the controller 80, and a collector reversely connected to the diode 32 and connected to the inductor 34, or a thyristor having an anode connected to the anode side of the DC power supply unit 10, a gate connected to the controller 80, and a cathode reversely connected to the diode 32 and connected to the inductor 34.

The switching element 31 may be provided with a free-wheeling diode (a so-called flyback diode) connected in parallel to consume charged energy when the inductor 34 discharges the charged energy.

The diode 32 is a blocking diode for allowing DC current from the DC power supply unit 10 to flow toward the inductor 34 and block the DC current from flowing toward the ground when the switching element 31 is in an ON state.

The inductor 34 allows a flow of a DC component and blocks a flow of an alternating current (AC) component, and supplies the DC energy from the DC power supply unit 10 to the first capacitor 50 when the switching element 31 is in the ON state.

The battery 40, as described above, can charge the DC electric energy from the DC power supply unit 10 or discharge the charged electric energy under the control of the controller 80.

The battery 40, as described above, may be configured as a zinc-bromine flow battery according to the preferred embodiment.

In FIG. 2, a reference numeral 42 denotes a current limiting resistor.

The first capacitor 50 is connected in series to the battery 40 and serves to completely discharge the battery 40 in a manner that the sum of the voltage across the battery 40 and the voltage across the first capacitor 50 is higher than the output voltage of the first DC-DC converter 20.

The bypass switch 60 is connected in parallel to the first capacitor 50. More specifically, one end of the bypass switch 60 is connected to an anode side of the first capacitor 50 and the other end is connected to the ground.

During a period except for a charging period of the first capacitor 50, the bypass switch 60 may be controlled to a closing position by the controller 80 to bypass the DC current supplied through the inductor 34 to the ground.

The discharge switch 70 is connected in parallel to the bypass switch 60. When electric energy charged in the first capacitor 50 is discharged, the discharge switch 70 is controlled to the closing position by the controller 80 to discharge the electric energy charged in the first capacitor 50 to the ground. At this time, the bypass switch 60 is controlled by the controller 80 to be switched to an opening position.

In FIG. 2, a resistor 72 connected in series to the discharge switch 70 at a position close to the bypass switch 60 is a current limiting resistor for limiting the current discharged from the first capacitor 50.

Hereinafter, the operation of the battery control circuit for the power generation system using the renewable energy according to the preferred embodiment of the present invention will be described with reference to FIG. 2.

The controller 80 controls the first DC-DC converter 20 so that the battery 40 performs the strip operation when a number of times of charging and discharging the battery 40 reaches a preset number of times.

The preset number of times may be a number of times of starting the strip operation of the battery 40 according to a user setting when the charging and discharging of the battery 40 is repetitively performed.

According to the preferred embodiment, one-time charging and one-time discharging of the battery 40 may be set to one cycle, and the preset number of times may be set preferably to one of 6 to 10 cycles. That is, according to the preferred embodiment, the controller 80 may control the first DC-DC converter 20 to perform the discharging operation when the charging/discharging of the battery 40 reaches 6 cycles.

When charging the battery 40, the switching element included in the first DC-DC converter 20 operates to provide a current flow path in a first direction under the control of the controller 80, such that the DC energy is supplied from the DC power supply unit 10 to be charged in the battery 40.

When discharging the battery 40, the switching element included in the first DC-DC converter 20 operates to provide a current flow path in a second direction under the control of the controller 80, such that the DC energy is discharged from the battery 40 to the ground.

When the battery 40 is fully discharged, that is, when the battery 40 is stripped, the battery 40 continues to discharge energy while the sum of the voltage (charge voltage) across the battery 40 and the voltage (charge voltage) across the first capacitor 50 is higher than the output voltage of the first DC-DC converter 20 since the first capacitor 50 is connected in series to the battery 40 in accordance with the one preferred aspect of the present invention.

Also, in order to discharge the battery 40 completely, the controller 80 may control the switching element of the first DC-DC converter 20 to form the current flow path in the second direction and the switching element of the second DC-DC converter 30 to be turned on, so that the sum of the voltage across the battery 40 and the voltage across the first capacitor 50 is higher than the output voltage of the first DC-DC converter 20.

Since the sum of the voltage (charge voltage) across the battery 40 and the voltage (charge voltage) across the first capacitor 50 should be maintained to be higher than the output voltage of the first DC-DC converter 20 in order to completely discharge the battery 40, the voltage (charge voltage) across the first capacitor 50 needs to be maintained to be more than a predetermined voltage. Therefore, the controller 80 controls the bypass switch 60 to be turned off and the switching element 31 of the second DC-DC converter 30 to be turned on so as to charge the first capacitor 50.

Thus, while the battery 40 continues to perform the discharging operation, the DC current from the DC power supply unit 10 may be supplied to the first capacitor 50 through the switching element 31 and the inductor 34 of the second DC-DC converter 30, and electric energy may be charged in the first capacitor 50.

When the electric energy of the battery drops down to 20% of the electric energy in a fully-charged state of the battery due to the characteristic of the general battery, the voltage (charging voltage) across the battery becomes low and this makes it difficult to discharge the battery completely.

However, in the battery control circuit according to the present invention, the voltage (charge voltage) of the first capacitor 50 may be controlled such that the sum of the voltage (charge voltage) across the battery 40 and the voltage (charge voltage) across the first capacitor 50 is higher than the output voltage of the first capacitor 50. Therefore, the battery control circuit according to the present invention can completely discharge even the 20% (%) of the electric energy remaining in the battery 40.

Upon the battery 40 being completely discharged, a large current is likely to damage the bypass switch 60 when the bypass switch 60 is switched to an ON position. Thus, the controller 80 discharges the first capacitor 50. At this time, when the controller 80 controls the bypass switch 60 to a turn-off position and the discharge switch 70 to a turn-on position, the electric energy charged in the first capacitor 50 is discharged and the discharged current is limited by the current limiting resistor 72, thereby preventing the damage on the discharge switch 70.

In order to charge and discharge the battery 40 again, the controller 80 controls the bypass switch 60 to the turn-on position (a so-called closing position), and the discharge switch 70 to the turn-off position (a so-called opening position) and the switching element 31 of the second DC-DC converter 30 to the turn-off position.

Hereinafter, description will be given with reference to FIG. 3 which illustrates a detailed configuration of a first converter according to one preferred embodiment of the present invention.

Figure 3:
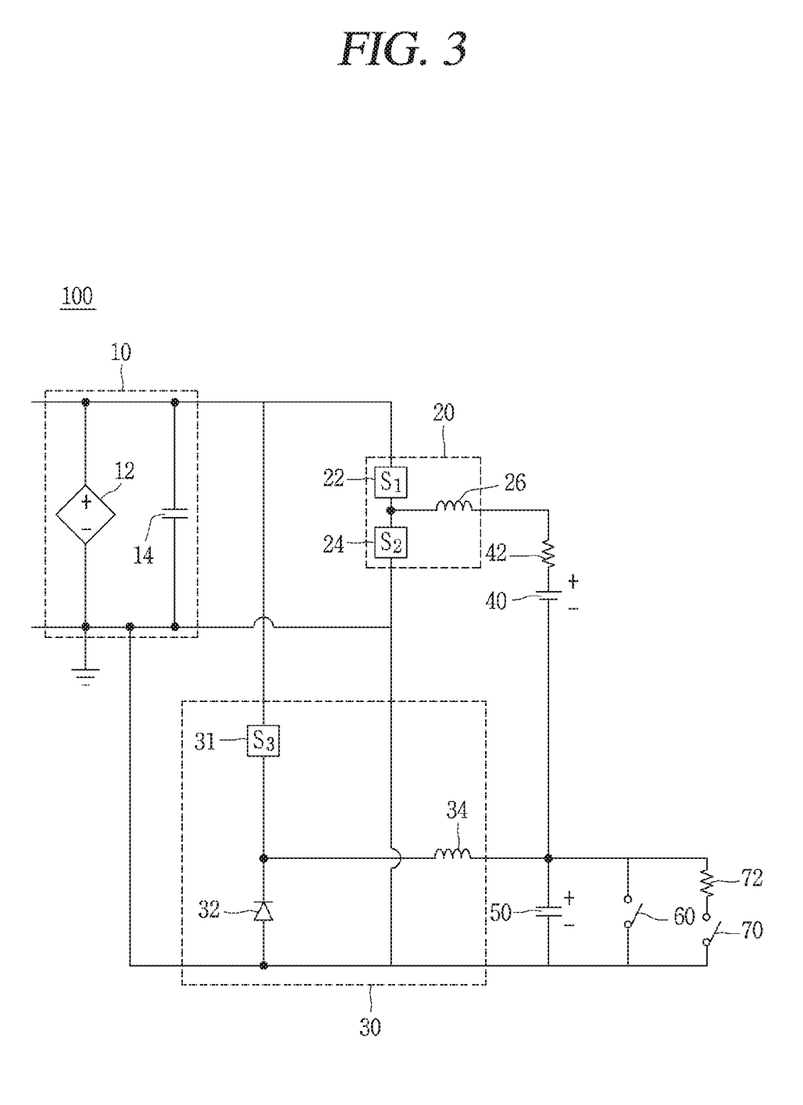
FIG. 3 is a detailed view of a battery control circuit illustrating a detailed configuration of a first DC-DC converter in accordance with one preferred embodiment of the present invention.

A battery control circuit according to the present invention illustrated in FIG. 3 is different from the battery control circuit according to the present invention illustrated in FIG.

2, only in that the detailed structure of the first DC-DC converter according to one embodiment is illustrated.

Therefore, to avoid redundant description, description will be given of only the detailed configuration and operation of the first DC-DC converter and description of other components and operations will be omitted.

In FIG. 3, the first DC-DC converter 20 includes a first switching element 22, a second switching element 24, and an inductor 26.

The first switching element 22 is connected to the DC power supply unit 10, particularly, to the anode side of the voltage source 12.

The second switching element 24 is connected in series to the first switching element 22.

The inductor 26 has one end connected to a connection point where the first switching element 22 and the second switching element 24 are connected to each other, and another end connected to the battery 40. The inductor 26 may allow a flow of a DC component and block a flow of an AC component. Therefore, the DC current can be supplied from the DC power supply unit 10 to the battery 40 through the inductor 26.

Hereinafter, the operation of the first DC-DC converter 20 will be described.

When charging the battery 40, the first switching element 22 included in the first DC-DC converter 20 operates to provide the current flow path in the first direction under the control of the controller 80, such that the DC energy is supplied from the DC power source unit 10 into the battery 40.

When discharging the battery 40 including a case of fully discharging the battery 40, the first switching element 22 is switched to the opening position (or turn-off position) and the second switching element 24 is controlled to the closing position (or turn-on position), under the control of the controller 80 included in the first DC-DC converter 20. Accordingly, the current flow path in the second direction is provided and thus the DC energy is discharged from the battery 40 to the ground.

Figure 4:
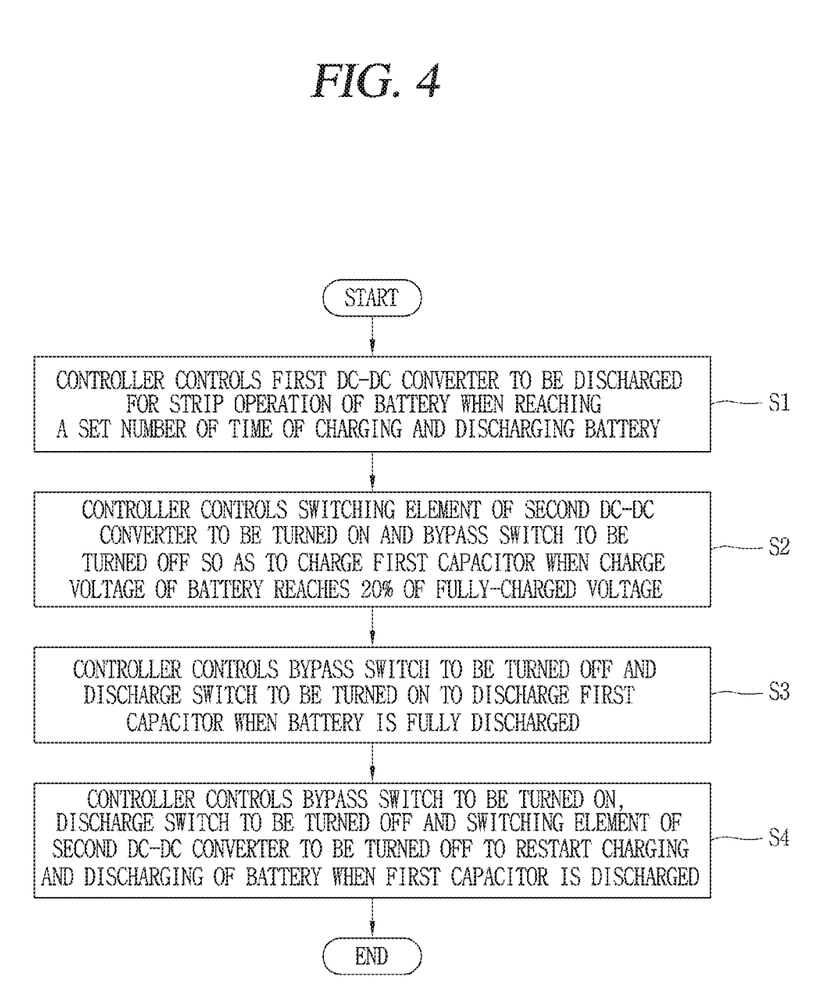
FIG. 4 is a flowchart illustrating an operation of controlling a strip operation of a battery control circuit executed by a controller, in a battery control circuit according to one preferred embodiment of the present invention.

Meanwhile, FIG. 4 is a flowchart illustrating an operation of controlling a strip operation of a battery performed by a battery control circuit according to a preferred embodiment of the present invention. Hereinafter, description will be given with reference to FIG. 4 together with FIGS. 1 to 3.

When a number of times of charging and discharging the battery reaches a preset number of times, the controller 80 controls the switching element of the first DC-DC converter 20 to form a current flow path in a second direction such that a strip operation (full discharge) of the battery 40 is started (51).

When a voltage across the battery 40 is equal to a preset voltage (for example, 20% of a fully-charged voltage) during the discharging operation of the battery 40, the controller 80 controls the bypass switch 60 to be turned off and the switching element 31 of the second DC-DC converter 30 to be turned on, so as to charge the first capacitor 50 (S2).

Therefore, the sum of the voltage across the battery 40 connected in series to the first capacitor 50 and the voltage across the first capacitor 50 is kept higher than an output voltage of the first DC-DC converter 20, the electric energy charged in the battery 40 may be completely discharged to the ground through the second switching element 24 of the first DC-DC converter 20.

The controller 80 can determine whether the battery 40 is fully discharged. This can be performed as the controller 80 receives voltages detected by voltage detection sensors (shunt resistors, potential transformers, etc.) (not illustrated) connected to both ends of the battery 40.

When the battery 40 is completely discharged, the controller 80 controls the bypass switch 60 to be turned off and the discharge switch 70 to be turned on in order to discharge the first capacitor 50 (S3).

When the discharge switch 70 is turned on, the electric energy charged in can be discharged to the ground while a discharging current from the first capacitor 50 is limited by the current limiting resistor 72.

When the first capacitor 50 is discharged, the controller 80 may control the switching element 31 of the second DC-DC converter 30 to be turned off, the bypass switch 60 to be turned on and the discharge switch 70 to be turned off, so as to restart charging and discharging of the battery 40 (S4).

The control operation of the above-described controller may be executed by a processing program prestored in a memory.

As described above, the battery control circuit for the power generation system using the renewable energy according to the present invention may connect the first capacitor 50 in series to the battery 40 and maintain the sum of the voltage across the battery 40 and the voltage across the first capacitor 50 to be higher than the output voltage of the first DC-DC converter 20, which may result in facilitating the full discharge, namely, the strip operation of the battery 40.

In the battery control circuit for the power generation system using the renewable energy according to the present invention, while the battery is fully discharged, the charge voltage of the first capacitor can be controlled to be maintained higher than the output voltage of the first DC-DC converter, thereby facilitating the full discharge of the battery.

The battery control circuit for the power generation system using the renewable energy according to the present invention may further include the bypass switch which is connected in parallel to the first capacitor and controlled to the closing position by the controller when charging or discharging the battery. Accordingly, the charging or discharging operation of the battery can be fast executed.

The battery control circuit for the power generation system using the renewable energy according to the present invention may further include the discharge switch. Accordingly, the controller may control the discharge switch to the closing position to discharge the electric energy charged in the first capacitor.

In the battery control circuit for the power generation system using the renewable energy according to the present invention, when the voltage across the battery reaches a predetermined value, the controller may control the bypass switch to the opening position. Therefore, it is possible to obtain an effect that the DC current can be supplied from the DC power supply unit to the first capacitor without a loss to the side of the bypass switch.

In the battery control circuit for the power generation system using the renewable energy according to the present invention, during discharging of the battery, the controller can control the first capacitor to be charged in a manner of controlling the switching element of the first DC-DC converter to form a current flow path in a second direction (discharging direction) and the switching element of the second DC-DC converter to be turned on. Therefore, the sum of the voltage across the battery and the voltage across the first capacitor can be maintained to be higher than the output voltage of the first DC-DC converter, which may result in fully discharging the electric energy charged in the battery.

In the battery control circuit for the power generation system using the renewable energy according to the present invention, when the battery is completely discharged, the controller may control the bypass switch to be turned off and the discharge switch to be turned on. Accordingly, it is possible to prevent the bypass switch from being damaged due to a large current flowing to the bypass switch when the capacitor is discharged.

In the battery control circuit for the power generation system using the renewable energy according to the present invention, when the first capacitor is discharged, the controller may control the bypass switch to be turned on, the discharge switch to be turned off, and the switching element of the second DC-DC converter to be turned off. This may provide an effect of being ready for charging and discharging the battery again.

In the battery control circuit for the power generation system using the renewable energy according to the present invention, the first DC-DC converter includes a first switching element connected to an anode side of the DC power supply unit and providing a charging path of the battery, a second switching element connected in series to the first switching element and providing a discharging path of the battery, and an inductor having one end connected to a connection point where the first switching element and the second switching element are connected to each other, and another end connected to the battery, so as to allow a flow of a DC component and block a flow of an AC component. Accordingly, the battery can be charged through the first switching element and discharged through the second switching element, and also a pure DC component from which the AC component is removed through the inductor can be provided to the battery.

In the battery control circuit for the power generation system using the renewable energy according to the present invention, the DC power supply unit may include a voltage source for supplying a DC voltage and a second capacitor, so that the DC voltage from the voltage source can be smoothed and supplied as a constant voltage.

What is claimed is:

1. A battery control circuit for a power generation system using renewable energy, the circuit comprising:
   a flow battery configured to charge direct current (DC) electric energy or discharge charged DC electric energy;
   a DC power supply unit configured to supply the DC electric energy to the flow battery;
   a first DC-DC converter having a first path for supplying the DC electric energy from the DC power supply unit to the flow battery, and a second path for discharging the DC electric energy charged in the flow battery to a ground;
   a first capacitor;
   a second DC-DC converter configured to supply the DC electric energy from the DC power supply unit to the first capacitor such that the first capacitor is charged; and
   a controller configured to
      control the first DC-DC converter to charge or discharge the flow battery,
      count a number of cycles the flow battery is charged or discharged, and
      when the number of cycles of charging or discharging reaches a preset number of cycles, control the first DC-DC converter to discharge the DC electric energy in the flow battery through the second path for a full discharge of the flow battery and connect the first capacitor with the flow battery in series so that a discharge is continued for a time period in which a sum of a voltage of the discharged flow battery and a voltage of the first capacitor is higher than an output voltage of the first DC-DC converter.

2. The circuit of claim 1, wherein a charge voltage of the first capacitor is higher than the output voltage of the first DC-DC converter when fully discharging the flow battery.

3. The circuit of claim 1, further comprising a bypass switch connected in parallel to the first capacitor, and controlled to a closing position by the controller when charging or discharging the flow battery.

4. The circuit of claim 3, further comprising a discharge switch connected in parallel to the bypass switch, and controlled to a closing position by the controller when discharging electric energy charged in the first capacitor.

5. The circuit of claim 3, wherein the controller is configured to control the bypass switch to an opening position to charge the first capacitor, when the voltage between the both ends of the flow battery becomes a preset value while the flow battery is fully discharged.

6. The circuit of claim 4, wherein when the flow battery is fully discharged, the controller is configured to controls the bypass switch to be turned off and the discharge switch to be turned on so as to discharge the first capacitor.

7. The circuit of claim 6, wherein when the first capacitor is discharged, the controller is configured to control the bypass switch to be turned on, the discharge switch to be turned off, and the second DC-DC converter to be turned off, so as to charge and discharge the flow battery again.

8. The circuit of claim 1, wherein the first DC-DC converter comprises:
   a first switching element that is connected to an anode side of the DC power supply unit and provides a charging path of the flow battery;
   a second switching element that is connected in series to the first switching element and provides a discharging path of the flow battery; and
   an inductor that has one end connected to a connection point where the first switching element and the second switching element are connected to each other, and another end connected to the flow battery, the inductor allowing a flow of a DC component and blocking a flow of an AC component.

9. The circuit of claim 8, wherein the first DC-DC converter is configured to charge or discharge the flow battery by switching operations of the first switching element and the second switching element,
   wherein the controller is configured to control the first switching element to be turned on and the second switching element to be turned off when charging the flow battery, and
   wherein the controller is configured to control the second switching element to be turned on and the first switching element to be turned off when discharging the flow battery.

10. The circuit of claim 1, wherein the DC power supply unit comprises:
    a voltage source that supplies a DC voltage; and
    a second capacitor that is connected in parallel to the voltage source to smooth the DC voltage from the voltage source to a constant voltage and supply the constant voltage.

* * * * *